Aug. 4, 1959
J. M. AGAR
2,897,923
SHOCK ABSORBER
Filed Oct. 25, 1956
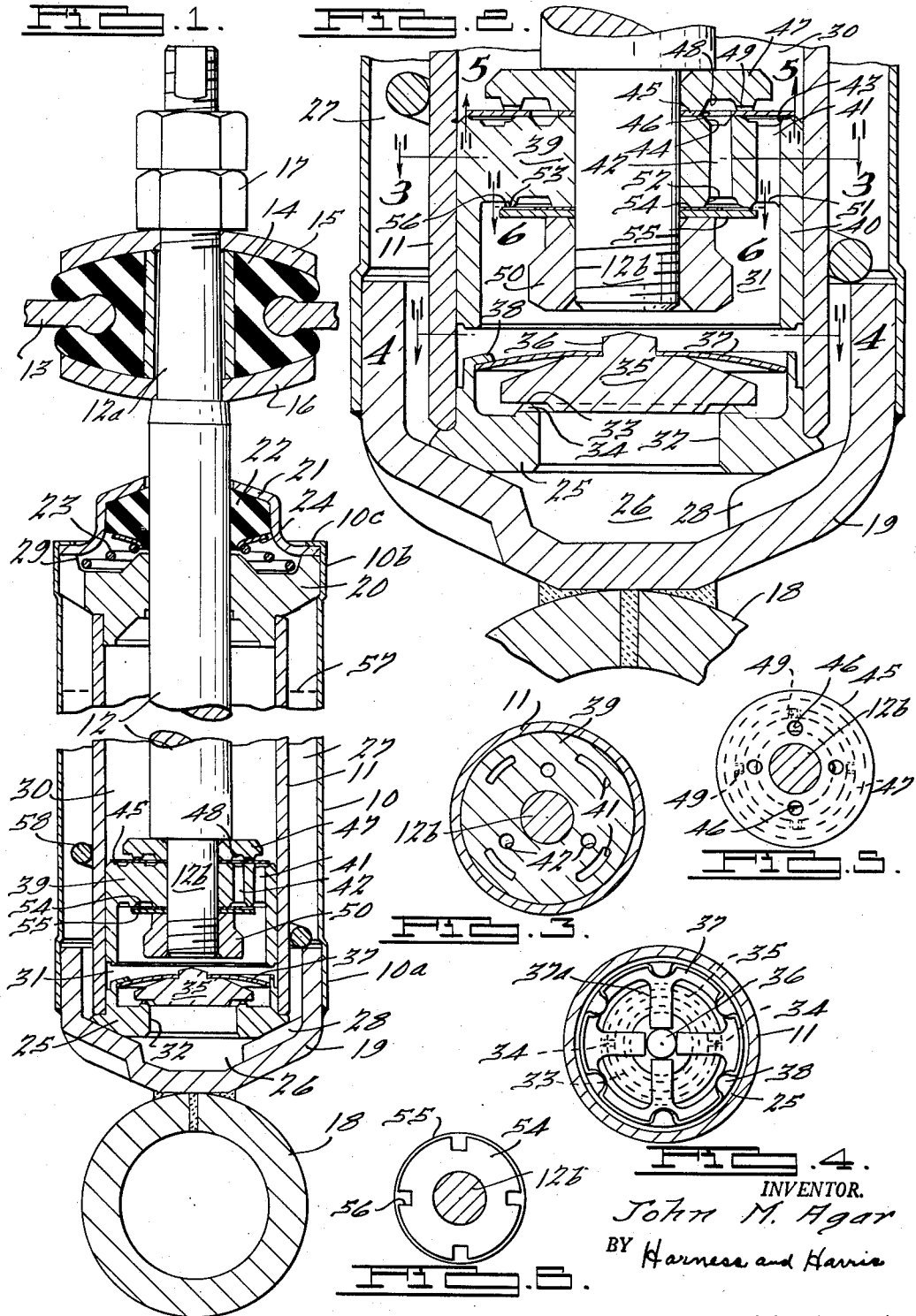
INVENTOR.
John M. Agar
BY Harness and Harris
ATTORNEYS

United States Patent Office 2,897,923
Patented Aug. 4, 1959

2,897,923

SHOCK ABSORBER

John M. Agar, Highland Park, Mich., assignor to Chrysler Corporation, Highland Park, Mich., a corporation of Delaware Application October 25, 1956, Serial No. 618,208

5 Claims. (Cl. 188—88)

This invention relates to shock absorbers, and more particularly to improvements in hydraulic shock absorbers of the direct acting telescopic type commonly employed to control relative movement between the sprung and unsprung masses of a motor vehicle.

An object of the present invention is to provide a shock absorber which will function to provide improved riding comfort with improved vehicle stability and safety over all types of roads, relative to the corresponding characteristics of presently known shock absorbers used for example on passenger automobiles, trucks, and buses.

Another object is to provide a shock absorber of simplified improved construction such that the shock absorber can be manufactured and assembled at relatively low cost.

Another object is to provide a superior method of hydraulic damping wherein the fluid medium is utilized with improved efficiency and effectiveness in controlling relative movement between the wheels and body of a motor vehicle for example.

Another and more specific object is to provide a versatile shock absorber of the above character which is particularly susceptible to modification for use with vehicles of appreciably different types and weights without necessitating alteration of the major components of the shock absorber, thereby enabling manufacturing economies by rendering feasible the use of substantially the same shock absorber assembly, with minor structural modifications, on various types of vehicles.

Another object is to provide a shock absorber whereby an optimum ratio between the rebound or extension resistance to the jounce or compression resistance is readily achieved over a wide range of shock absorbing applications, and in particular, to provide such a shock absorber wherein the resistance to low velocity extension or rebound is increased to a desirable extent without materially changing the corresponding low velocity resistance to jounce or compression.

Other objects of this invention will appear in the following description and appended claims, reference being had to the accompanying drawings forming a part of this specification wherein like reference characters designate corresponding parts in the several views.

Figure 1 is a fragmentary axial sectional view through a shock absorber embodying the present invention.

Figure 2 is a fragmentary enlarged view similar to Figure 1, showing details of the piston and valve assemblies.

Figure 3 is a sectional view taken in the direction of the arrows substantially along the line 3—3 of Figure 2, on a reduced scale as in Figure 1.

Figure 4 is a reduced sectional view taken in the direction of the arrows substantially along the line 4—4 of Figure 2.

Figure 5 is a reduced sectional view taken in the direction of the arrows substantially along the line 5—5 of Figure 2.

Figure 6 is a reduced sectional view taken in the direction of the arrows substantially along the line 6—6 of Figure 2.

The shock absorber illustrated in the drawings can be used to advantage with many types of wheel suspensions and, in the broader aspects of the invention, with other mechanisms and devices wherein damping of relatively movable bodies is desired. In applying the improved shock absorber to motor vehicles, it is only necessary to connect opposite ends of the telescopic assembly respectively to two parts of the vehicle, one part moving in response to rise and fall of the ground wheel, and the other part moving in response to rise and fall of the body or frame, such that relative movement between the parts is under damping control by the shock absorber. A typical application for which the present shock absorber is adapted is illustrated in Lewton et al. Patent No. 2,670,813 for both front and rear wheel suspensions of a motor vehicle. The present shock absorber is constructed and proportioned to provide what may be termed generally optimum results for a particular type of situation, it being apparent that deviations from the structure shown may be undertaken as desired without departing from the principles of the present invention as set forth herein and as defined in the appended claims. As a typical representation of these principles, a front shock absorber is shown which could effectively replace the front shock absorber shown in said Lewton et al. patent.

Referring in more particularity to the drawings, the shock absorber comprises an assembly of cylindrical parts including coaxially spaced outer and inner tubular members 10 and 11, the inner cylinder 11 containing a piston assembly reciprocal with a coaxial plunger rod 12.

In the present instance, the rod 12 is provided with a reduced portion 12a resiliently secured to the enlarged rounded inner circumferential portions of an annular plate 13 fixed with respect to the sprung mass of the vehicle body, which rounded portions are firmly seated within an annular socket of a resilient support 14 of rubber or rubber-like material. The support 14 is sleeved coaxially on the reduced portion 12a and is confined under compressional force between confronting concave washers 15 and 16 of comparatively rigid sheet metal, such as steel for example. Washers 15 and 16 are maintained under suitable compression against the resilient support 14 by a lock nut assembly 17 screwed on the upper end of the portion 12a against the washer 15 and maintaining the washer 16 firmly seated against the shoulder of the rod 12 at the base of the reduced portion 12a.

At the lower end of the tubular assembly, an eye or end ring 18 adapted to be secured to the underside of the unsprung mass of the vehicle is welded to the underside of a cup-like base 19. The latter is sleeved upwardly into an enlarged lower end portion 10a of the outer cylinder 10 and suitably secured thereto as by welding. The upper end of the cylinder 10 is similarly enlarged at 10b to contain an annular upper end-closure 20 and inverted cup-like retainer 21 firmly therein. The portion 10b terminates in an upper flange 10c overlapping a radially flared portion of the retainer 21 to maintain the same tightly against the upper surface of the closure 20. A seal or packing 22 of compressible material is confined within the retainer 21 under compression against the rod 12 by means of a coil spring 23. The latter extends around rod 12 and is compressed between the closure 20 and an upper annular spring seat 24 adjacent the underside of the seal 22 in supporting relation therewith.

Seated within the cup 19 adjacent the base thereof is an annular valve body 25 opening downwardly into a cavity 26 at the base of the cup 19 and thence via duct 28 into a hydraulic fluid reservoir 27 between the outer and inner cylinders 10 and 11. As illustrated in Figure 1, a drain duct 29 opens from the upper end of the reservoir 27 into the chamber containing spring 23 in order to provide for drainage of fluid which might leak upwardly between the rod 12 and end closure 20.

The lower end of the rod 12 is reduced at 12b to receive a coaxial piston assembly which partitions the space within the cylinder 11 into an upper rebound chamber 30 and a lower compression chamber 31. Extending around the central opening 32 of the valve body 25 is an upper annular valve seat 33, Figure 2, having a pair of upwardly opening restricted radial notches or bleed ducts 34 providing restricted communication between the compression chamber 31 and opening 32 for passage of hydraulic fluid. Seated on the annular seat 33 is a base or check valve 35 normally blocking communication between the compression chamber 31 and opening 32 except for the aforesaid restricted bleed ducts 34. An upper central portion of the valve 35 comprising a hub 36 is maintained in coaxial alignment with the rod 12 and opening 32 by four inwardly directed spring arms 37a of an annular spider spring 37. The periphery of the latter is held downwardly by a number of overlying tabs 38 of the valve body 25.

It is apparent from the foregoing that a restricted flow of hydraulic fluid from within the compression chamber 31 into the opening 32 and thence into the chamber 26, duct 28, and reservoir 27, is permitted at all times by the bleed ducts 34. In the event that the fluid pressure within the reservoir 27 should slightly exceed the fluid pressure within the compression chamber 31, valve 35 will be raised against the tension of spring arms 37a to enable a comparatively unrestricted flow into chamber 31. To this end the valve 35 and spring arms 37a are preferably of light weight construction to afford comparatively unobstructed fluid flow from the reservoir 27 into the compression chamber 31.

The piston assembly includes an annular body 39 having its outer periphery and an integral depending annular guide skirt 40 in snug sliding engagement with the cylinder 11. As illustrated in Figures 2 and 3, circumferentially spaced outer compression ports 41 and also circumferentially spaced inner rebound ports 42 extend axially through the piston body 39. An upwardly opening circular channel 43 in the upper end of the body 39 connects the upper ends of the ports 41. Similarly an upwardly opening circular channel 44 in the upper end of the body 39 connects the upper ends of the ports 42. Seated on the upper end of the body 39 and overlying the compression ports 41 so as normally to close the same is an annular resilient disc or diaphragm valve 45 which is provided with a number of openings 46 overlying the channel 44 and communicating therethrough with the rebound ports 42.

Above the portions of the valve 45 inwardly of the compression ports 41 is a rigid annular clamping member 47 having a circular downwardly opening groove 48 overlying the groove 44. Also in the under surface of the member 47 and extending radially outwardly from the groove 48 are four constricted bleed ducts 49, Figure 5, effective to establish a restricted bleeder communication between the rebound chamber 30 and ports 42 via the channels 44 and 48 and openings 46. The outer peripheral portions of the member 47 in contact with the valve 45 terminate slightly inwardly of the ports 41 to enable upward springing of the outer peripheral portions of the resilient valve 45 responsive to a predetermined fluid pressure in the compression chamber 31 in excess of the fluid pressure in the rebound chamber 30, as explained below. The upper surface of the retainer 47 seats against the shoulder of the rod 12 at the upper end of the reduced portion 12b and is maintained snugly thereagainst by a nut 50 screwed on the lower extremity of the rod portion 12b.

Opening downwardly in the under surface of the valve body 39 and underlying the grooves 43 and 44 respectively, are circular grooves 51 and 52 spaced by an annular depending ridge 53. Clamped between the nut 50 and body 39 is an upper spacer or shim 54 and a lower resilient disc or diaphragm valve 55. The latter underlies and extends radially beyond the ridge 53 and is spaced slightly therefrom by the shim 54 having four circumferentially spaced bleeder notches therein, Figure 6, to effect bleed ducts 56 communicating between channel 52 and compression chamber 31. As explained below, the total cross sectional area of the ducts 56 is of the order of magnitude and preferably smaller than the total cross sectional area of the four ducts 49. Also as will be apparent from the following, the resistance of the outer portions of resilient valve 55 to downward pressure is preferably somewhat greater than the corresponding resistance of resilient valve 45 to upward pressure.

In operation of the foregoing structure, sufficient hydraulic fluid is maintained within the tubular assembly to fill the chambers 30 and 31 completely and to maintain the reservoir 27 partially filled substantially to the level 57 when the rod 12 is at its lower limit of downward or jounce movement, Figure 1. Normally the piston 39 will ride in a mid-region of the cylinder 11 until the vehicle on which it is mounted is subjected either to jounce or rebound forces.

When the shock absorber is subjected to a compressional or jounce force tending to move the rod 12 and attached piston 39 downwardly with respect to the cylinder 11, prior to opening of resilient valve 45 the downward movement is resisted in part by the resistance to fluid flow from compression chambers 31 into rebound chamber 30 through the bleed ducts or restrictions 56 and 49 in series, and in part by the resistance of bleed ducts or restrictions 34 to fluid flow therethrough from the compression chamber 31 into chamber 26 and thence via duct 28 into reservoir 27. In this regard, the ports 41 and 42 and passages 32, 26, and 28 are sufficiently oversized to offer substantially no resistance to fluid flow therethrough. To minimize churning of fluid passing into reservoir 27, a spiral baffle 58 is provided within the lower portion of the reservoir 27 and is seated on the upper edge of the base cup 19.

In order to prevent cavitation in chamber 30 during a low velocity compression stroke, the volume of fluid displaced from compression chamber 31 through restrictions 56 and 49 must equal the increase in volume of rebound chamber 30. The volume of fluid displaced from compression chamber 31 through restrictions 34 will thus equal the volume of the plunger 12 which enters chamber 11. Accordingly, during the low velocity compression movement, the resistance of restrictions 34 to fluid flow at the volume rate equal to the rate of volume displacement caused by entry of rod 12 into cylinder 11 will at least be equal to and preferably greater than the total resistance of restrictions 49 and 56 to fluid flow therethrough at the volume rate equal to the rate of enlargement of the volume of chamber 30.

Above a predetermined compression force, the pressure in chamber 31 acting through ports 41 progressively opens normally closed resilient valve 45 as the compression force increases, whereupon the passage area for fluid flow through the ported piston 39 from chamber 31 into chamber 30 progressively increases. Nevertheless the proportion of the flow through restrictions 49 and 56 continues to contribute a noticeable effect. The greater the resistance of these restrictions, the less will be the resistance required to open valve 45 to accomplish any given total resistance to fluid flow through the ported piston during the compression movement, and correspondingly, the greater can be the flexibility of valve 45. The increased flexibility of valve 45 without sacrificing total resistance to compression movement is desirable primarily to minimize the possibility of cavitation above the piston as the velocity of compression movement increases. In any event, the resiliency of valve 45 is predetermined so that the latter will open during high velocity compression movement and in cooperation with restrictions 49 and 56 will offer less resistance to upward flow than is offered by bleed ducts 34 to flow from chamber 31 into chamber 26. As the jounce or compression force increases, the resistance of restrictions 34 becomes increasingly important in resisting the downward jounce movement.

In regard to the restrictions 49 and 56, the resistance of the latter to fluid flow is preferably appreciably greater than the resistance of the former. Thus as explained below, restrictions 49 can be dimensioned to achieve any desired maximum fluid flow therethrough at high velocity rebound movement when resilient valve 55 is open. During the compression movement however, the high resistance of restrictions 56 additive to the smaller resistance of restrictions 49 effects an increment of resistance to compression movement that would not be available if the openings at 56 were not restricted. This increment of resistance is effective throughout the entire range of compression movement, although the proportion of the upward fluid flow through restrictions 56 and 49, compared to the flow through valve 45, becomes progressively smaller as the latter valve progressively opens at higher compression velocities. As the compression velocity decreases and valve 45 progressively closes, the proportionate effect of restrictions 56 increases until finally, when valve 45 is completely closed, the entire fluid flow is through these restrictions. Accordingly the restrictions 56 can be feasibly dimensioned, or the number of these restrictions varied, so that the combined resistance of restrictions 49 and 56 to low velocity compression movement, as for example during boulevard driving conditions, will be several times greater than if the openings at 56 were not restricted. This factor is particularly desired to minimize "floating" of the vehicle body, which is objectionable under boulevard conditions when the shock absorber's resistance to low velocity movement is nominal. In such a case, the sprung mass of the vehicle body tends to rise and fall in accordance with its natural low velocity resonance frequency. By increasing the shock absorber's low velocity resistance as aforesaid, the floating movement is effectively damped and rendered unobjectionable.

The importance of the two restrictions 49 and 56 in series, of which restriction 56 has the greater resistance also becomes apparent in consideration of the rebound or upward movement. During low velocity rebound movement when rod 12 is subjected to comparatively light upward force with respect to cylinder 11, the fluid flow from chamber 30 to chamber 31 is via ducts 49 and 56. As rod 12 is retracted from cylinder 11, valve 35 lifts from its seat 33 against the light tension of spring arms 37a to enable comparatively unrestricted flow from reservoir 27 into compression chamber 31, thereby to prevent cavitation below piston 39. Above a predetermined rebound force, the pressure in chamber 30 acting through restrictions 49 and ports 42 progressively opens normally closed resilient valve 55, whereby the resistance of restrictions 56 becomes an ever decreasing proportion of the total rebound resistance as the rebound velocity of piston 39 and rod 12 increases.

Inasmuch as the resistance of restrictions 56 is greater than the resistance of restrictions 49, the former restrictions are largely responsible for rapid pressure buildup and resistance to low velocity rebound movement prior to opening of valve 55 and are effective to damp the rebound floating movement substantially as described above in regard to the low velocity compression movement. After valve 55 opens, the restrictions 56 are substantially bypassed and resistance to high velocity rebound movement becomes largely a factor of the resistance of restrictions 49 and the stiffness of spring valve 55.

By suitably varying the sizes of restrictions 49 and 56, which is readily accomplished merely by replacing the member 47 or shim 54 by corresponding members having restrictions 49 or 56 of the desired dimensions, substantially any desired performance curve of resistance to rebound movement can be obtained throughout the operating range of the rebound forces. By employing the comparatively high resistance restrictions 56 in series with the lower resistance restrictions 49, in combination with the spring valves 45 and 55 as described, a desired increase in the resistance to low velocity compression and rebound movements is achieved without necessitating appreciable change in the resistance to high velocity compression movement obtainable with conventional shock absorbers. In addition, for any given total compression resistance, the minimum pressure required to open spring valve 45 is substantially reduced.

I claim:

1. In a vehicle hydraulic shock absorber, a working cylinder, a reservoir, piston means reciprocable in said cylinder and partitioning the same into a compression chamber and a rebound chamber, the rebound chamber being closed and the compression chamber being in communication with said reservoir, said piston means having a port therethrough, a resilient disc valve at the rebound chamber side of said piston means, said valve having a yieldable portion overlying and normally closing said port and being progressively yieldable therefrom responsive to increasing pressure in said compression chamber resulting from increasing velocity of compression movement of said piston means above low velocity boulevard driving conditions, thereby to open said port progressively for fluid flow from the compression to the rebound chamber, said piston means also having a second port therethrough, a second resilient disc valve at the compression chamber side of said piston means, said second valve having a yieldable portion overlying said second port and being yieldable therefrom responsive to increasing pressure in said rebound chamber resulting from increasing velocity of rebound movement of said piston means above said low velocity boulevard driving conditions, thereby to open said second port progressively for fluid flow from the rebound to the compression chamber, a clamping member adjacent the rebound chamber side of a fixed portion of the first named disc valve and firmly clamping the same to said piston means, a restricted bleed duct between said clamping member and the rebound chamber side of said first named disc valve, one end of said duct opening into said rebound chamber and the other end communicating with said second port through an opening in said first named disc valve to bypass the latter valve, a second clamping member adjacent the compression chamber side of a fixed portion of said second disc valve and firmly clamping the same to said piston means, a second restricted bleed duct between the surface of said piston means and the side of said second disc valve opposite the latter's compression chamber side, one end of the second bleed duct opening into said compression chamber and the other end opening into said second port to bypass said second disc valve.

2. The combination according to claim 1 wherein the resistance to fluid flow through the second bleed duct is greater than the resistance to fluid flow through the first-named bleed duct, a check valve normally opposing communication between said compression chamber and reservoir and being responsive to a predetermined low fluid pressure in said reservoir to establish said communication for fluid flow in one direction from said reservoir into said compression chamber, and a third bleed duct bypassing said check valve means to bleed fluid from said compression chamber into said reservoir during said compression movement.

3. In a vehicle hydraulic shock absorber, a working cylinder, a reservoir, piston means reciprocable in said cylinder and partitioning the same into a compression chamber and a rebound chamber, the rebound chamber being closed and the compression chamber being in communication with said reservoir, said piston means having a port therethrough, a resilient disc valve at the rebound chamber side of said piston means, said valve having a yieldable portion overlying and normally closing said port and being progressively yieldable therefrom responsive to increasing pressure in said compression chamber resulting from increasing velocity of compression movement of said piston means above low velocity boulevard driving conditions, thereby to open said port progressively for fluid flow from the compression to the rebound chamber, said piston means also having a second port therethrough, a second resilient disc valve at the compression chamber side of said piston means, said second valve having a yieldable portion overlying said second port and being yieldable therefrom responsive to increasing pressure in said rebound chamber resulting from increasing velocity of rebound movement of said piston means above said low velocity boulevard driving conditions, thereby to open said second port progressively for fluid flow from the rebound to the compression chamber, a clamping member adjacent the rebound chamber side of a fixed portion of the first named disc valve and firmly holding the same fixed with respect to said piston means, a restricted bleed duct between said clamping member and the rebound chamber side of said first named disc valve, one end of said duct opening into said rebound chamber and the other end communicating with said second port through an opening in said first named disc valve to bypass the latter valve, a second clamping member adjacent the compression chamber side of a fixed portion of said second disc valve and firmly holding the same fixed with respect to said piston means, a shim interposed between said piston means and second disc valve and spacing the latter from said second port to provide a second restricted bleed duct communicating with said compression chamber and second port to bypass said second disc valve.

4. In a vehicle hydraulic shock absorber, a working cylinder, a reservoir, piston means reciprocable in said cylinder and partitioning the same into a compression chamber and a rebound chamber, the rebound chamber being closed and the compression chamber being in communication with said reservoir, said piston means having a port therethrough, a resilient disc valve at the rebound chamber side of said piston means, said valve having a yieldable portion overlying and normally closing said port and being progressively yieldable therefrom responsive to increasing pressure in said compression chamber resulting from increasing velocity of compression movement of said piston means above low velocity boulevard driving conditions, thereby to open said port progressively for fluid flow from the compression to the rebound chamber, said piston means also having a second port therethrough, a second resilient disc valve at the compression chamber side of said piston means, said second valve having a yieldable portion overlying said second port and being yieldable therefrom responsive to increasing pressure in said rebound chamber resulting from increasing velocity of rebound movement of said piston means above said low velocity boulevard driving conditions, thereby to open said second port progressively for fluid flow from the rebound to the compression chamber, a clamping member adjacent the rebound chamber side of a fixed portion of the first named disc valve and firmly holding the same fixed with respect to said piston means, a restricted channel in the surface of said clamping member confronting the rebound chamber side of said first named disc valve and cooperating therewith to comprise a restricted bleed duct, one end of said duct opening into said rebound chamber and the other end communicating with said second port through an opening in said first named disc valve to bypass the latter valve, a second clamping member adjacent the compression chamber side of a fixed portion of said second disc valve and firmly holding the same fixed with respect to said piston means, a shim interposed between said piston means and second disc valve, said shim having a recess communicating with said compression chamber and second port to provide a second restricted bleed duct for bypass flow of fluid around said second disc valve during said low velocity movements of said piston means.

5. In a vehicle hydraulic shock absorber, a working cylinder, a reservoir, piston means reciprocable in said cylinder and partitioning the same into a compression chamber and a rebound chamber, the rebound chamber being closed and the compression chamber being in communication with said reservoir, said piston means having a port therethrough, valve means at the rebound chamber side of said piston means, said valve means having a resiliently yieldable portion normally closing said port and being progressively yieldable therefrom responsive to increasing pressure in said compression chamber resulting from increasing velocity of compression movement of said piston means above low velocity boulevard driving conditions, thereby to open said port progressively for fluid flow from the compression to the rebound chamber, said piston means also having a second port therethrough, a second valve means at the compression chamber side of said piston means, said second valve means having a resiliently yieldable portion restricting said second port and being yieldable therefrom responsive to increasing pressure in said rebound chamber resulting from increasing velocity of rebound movement of said piston means above said low velocity boulevard driving conditions, thereby to open said second port progressively for fluid flow from the rebound to the compression chamber, a clamping member adjacent the rebound chamber side of a fixed portion of the first named valve means and firmly clamping the same to said piston means, said first-named valve means and said clamping member cooperating to provide a restricted bleed duct, one end of said duct opening into said rebound chamber and the other end communicating with said second port through an opening in said first-named valve means to bypass the latter valve means, a second clamping member adjacent the compression chamber side of a fixed portion of said second valve means and firmly clamping the same to said piston means, said second valve means and said piston means cooperating to provide a second restricted bleed duct opposite the latter's compression chamber side, one end of the second bleed duct opening into said compression chamber and the other end opening into said second port to bypass said second valve means.

References Cited in the file of this patent

UNITED STATES PATENTS

| | | |
|---|---|---|
| 2,239,112 | Nickelsen | Apr. 22, 1941 |
| 2,655,233 | Funkhouser et al. | Oct. 13, 1953 |
| 2,676,676 | Strauss et al. | Apr. 27, 1954 |

FOREIGN PATENTS

| | | |
|---|---|---|
| 63,553 | France | Apr. 13, 1955 |
| | (Addition to No. 1,036,729) | |
| 907,858 | Germany | Mar. 29, 1954 |